United States Patent
Duvnjak

(10) Patent No.: US 8,705,252 B2
(45) Date of Patent: Apr. 22, 2014

(54) OFF LINE RESONANT CONVERTER WITH MERGED LINE RECTIFICATION AND POWER FACTOR CORRECTION

(75) Inventor: Rajko Duvnjak, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 326 days.

(21) Appl. No.: 13/088,281

(22) Filed: Apr. 15, 2011

(65) Prior Publication Data

US 2012/0262954 A1   Oct. 18, 2012

(51) Int. Cl.
*H02M 3/335* (2006.01)

(52) U.S. Cl.
USPC ........... 363/17; 363/21.02; 363/126; 363/127

(58) Field of Classification Search
USPC ........... 363/44, 45, 48, 76, 80, 81, 82, 84, 88, 363/89, 90, 125, 126, 127, 17
See application file for complete search history.

(56) References Cited

U.S. PATENT DOCUMENTS

| | | | |
|---|---|---|---|
| 5,063,490 A * | 11/1991 | Maehara et al. | 363/37 |
| 6,108,225 A * | 8/2000 | Iwahori et al. | 363/98 |
| 2011/0085354 A1* | 4/2011 | Wang et al. | 363/21.02 |
| 2012/0069615 A1* | 3/2012 | Tomioka | 363/126 |

FOREIGN PATENT DOCUMENTS

JP   2012-70490   *   9/2010   ............. H02M 7/06

OTHER PUBLICATIONS

English translation, JP,2012-070490,A.*
Ching-Ming Lai, et al., "Design and Implementation of a Single-Stage LLC Resonant Converter with High Power Factor," IEEE, 2007, pp. 455-460 (6 pages).
Ching-Ming Lai, et al., "A Single-Stage AC/DC LLC Resonant Converter," IEEE, 2006, pp. 1386-1390 (5 pages).

* cited by examiner

*Primary Examiner* — Nguyen Tran
(74) *Attorney, Agent, or Firm* — Blakely Sokoloff Taylor & Zafman LLP

(57) ABSTRACT

An off line resonant converter includes a boost storage inductance circuit coupled to a switcher circuit that includes stacked first and second passive switching devices coupled to the boost storage inductance circuit and stacked first and second active bidirectional switching devices coupled to the stacked first and second passive switching devices. The stacked first and second active bidirectional switching devices generate a square wave signal and alternately store energy in and receive energy from the boost storage inductance circuit such that a pulsating current is conducted between the boost storage inductance circuit and the switcher circuit. The pulsating current is bidirectional and flows in a direction responsive to a polarity of the ac input line voltage. A resonant circuit is coupled to an output of the switcher circuit to receive the square wave signal from the switcher circuit to generate an output of the resonant converter.

22 Claims, 16 Drawing Sheets

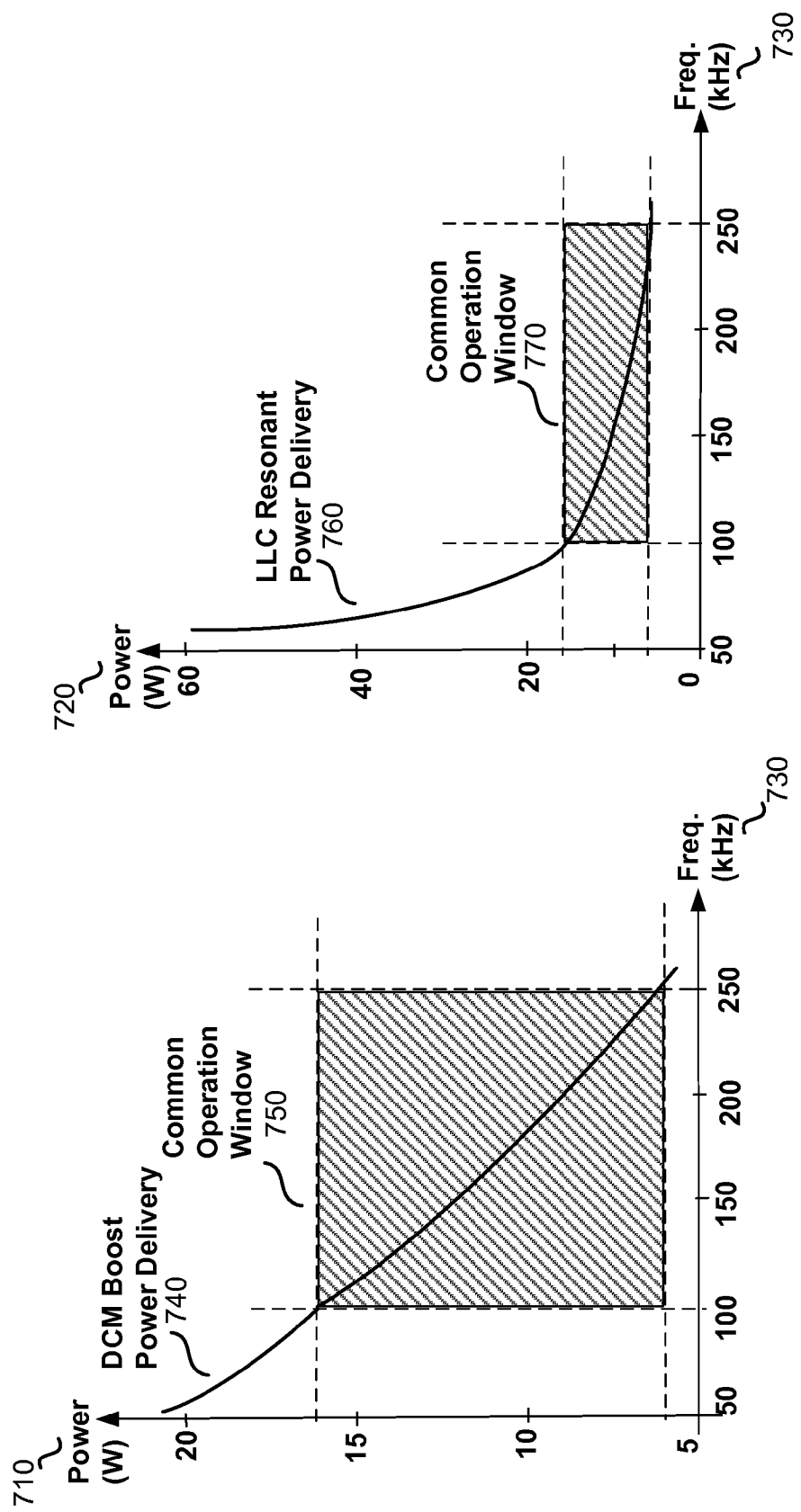

OFF LINE RESONANT CONVERTER WITH MERGED LINE RECTIFICATION AND POWER FACTOR CORRECTION

BACKGROUND INFORMATION

1. Field of the Disclosure

The present invention relates generally to power supplies, and in more particular introduces a new topology for the off line switched mode power supplies.

2. Background

Switch mode power supplies are used in a wide variety of household or industrial appliances that require a regulated direct current (dc) voltage for their operation. There are a wide variety of known power supply topologies using PWM (pulse width modulation) or PFM (pulse frequency modulation) control to regulate output voltage.

One type of power supply topology is a resonant switched mode power supply. Resonant switched mode power supplies with PFM control have some advantages, which include having sinusoidal waveforms and intrinsic soft switching. Resonant switched mode power supplies can also operate at higher switching frequencies with low switching loss, utilize smaller magnetic elements, which therefore require smaller packaging, and still operate with high efficiency. Since resonant switched mode power supplies generally do not have waveforms with sharp edges (e.g., waveforms having high di/dt or dv/dt) EMI performance is improved, which therefore enables the use of smaller EMI filters. The output of a resonant switched mode power supply is often achieved by sensing the output and controlling power supply in a closed loop by varying the switching frequency.

High frequency (HF) transformer isolated LLC converters are a type of resonant switched mode power supply, which utilizes the resonance between two inductors and a capacitor. HF transformer isolated LLC converters are popular for a number of reasons, which include the fact that savings on cost and size can be realized by utilizing the magnetizing and leakage inductance of the transformer as at least a part of the resonance component of the LLC converter. In addition, HF transformer isolated LLC converters can achieve good stability when they are operated at above resonance with zero voltage switching, which results in less switching loss and increased efficiency. Furthermore, HF transformer isolated LLC converters can achieve output regulation in a narrow band of frequency control because of their negative and high slope gain characteristic when operating above resonance.

HF transformer isolated LLC converters usually include an ac-dc front end stage to convert an ac signal received from a low frequency (60 or 50 Hz) ac network to a dc input received by the resonant converter stage. Off-line converters are generally required to with a near unity power factor to minimize the input Volt-Ampere consumption. A Power Factor Correction (PFC) front-end stage is interfaced with the ac network to achieve the near unity power factor. One of the most popular topologies for an ac-dc front-end PFC is a boost converter. A PFC boost converter operating in CCM (Continuous Conduction Mode) control with an inner current loop shapes the input current to follow the input voltage to achieve the near unity power factor. However, when operating in DCM (Discontinuous Conduction Mode), which occurs when current pulses through the inductor drop to zero before the end of each switching cycle, the average of each current pulse would naturally follow the sinusoidal waveform of input voltage without necessity of any extra current control loop.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 7A and 7B show diagrams that illustrate example relationships of power delivered with respect to a DCM boost converter versus frequency control (FIG. 7A) and with respect to an LLC resonant converter versus frequency control (FIG. 7B) in accordance with the teachings of the present invention.

DETAILED DESCRIPTION

Figure 1:
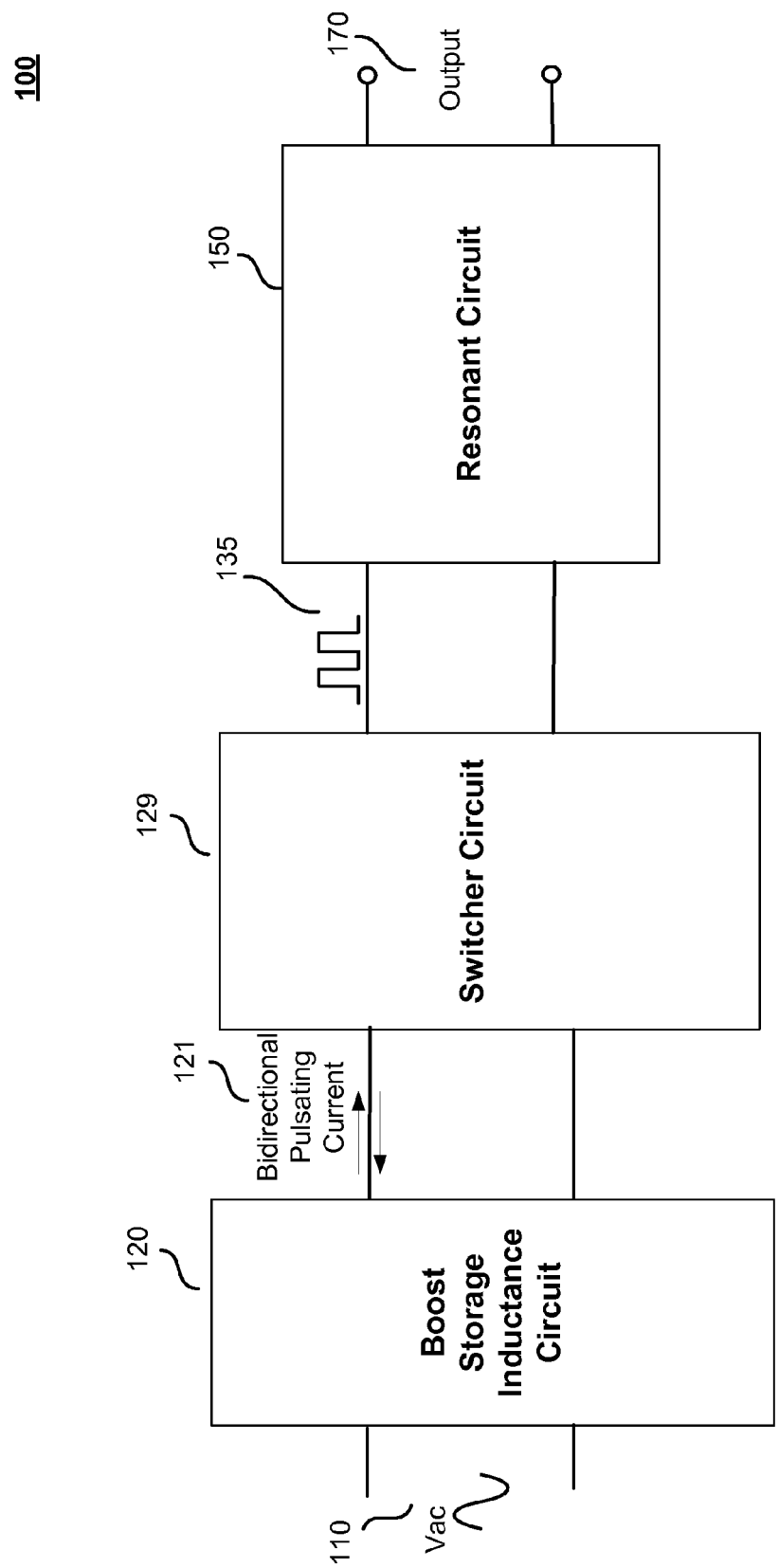
FIG. 1 is a block diagram illustrating generally one example of a resonant converter in accordance with the teachings of the present invention.

Methods and apparatuses for implementing resonant converters with merged line rectification and power factor correction are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, a cost effective resonant converter having merged line rectification and power factor correction with simple control and low component count is introduced. Thus, a separate input bridge rectifier is no longer necessary in accordance with the teachings of the present invention. In various examples, boost PFC functionality is integrated in a resonant circuit using a single PFM controller, which utilizes only two passive unidirectional switching devices, such as for example diodes, and two active bidirectional switching devices, such as for example MOSFETs, which are controlled with variable frequency complementary switching signals having a nearly 50% duty cycle in accordance with the teachings of the present invention.

As will be discussed, the combination of two passive unidirectional switching devices and two active controlled bidirectional switching devices introduces multiple functions in accordance with the teachings of the present invention. For instance, the functions of rectifying the input ac line, charging and discharging the PFC inductor to generate a high DC voltage across the DC link bus capacitance, as well as chopping the DC bus voltage into square wave pulses at the input of the resonant tank circuit, which in one example is an LLC resonant circuit, are all merged together in an example resonant converter in accordance with the teachings of the present invention. In operation, output regulation during load or line variations is achieved using PFM control with variable switching frequency control and considering boost DCM analysis versus frequency control (fixed D=50%), which could simultaneously control the power derived from boost and the resonant sections.

During DCM operation, the boost inductor of an example resonant controller is smaller in value, which results in discontinuous current pulses. In one example, the average of the DCM current pulses naturally follows the input voltage, which indicates power factor correction. However, the discontinuous current pulses result in high peak current ripple pulses that may be equal or greater than twice the average current and may require a higher maximum current rating of the devices as well as a larger EMI input filter.

As will be discussed, a new topology of an off line resonant converter with power factor correction in accordance with the teachings of the present invention does not need to sense the input ac voltage or the boost inductor current to achieve high power factor. It enjoys a natural high power factor with DCM operation and uses a relatively small value boost inductor on the ac line side before coupling to the switching devices. Furthermore, the new topology of an off line resonant converter with power factor correction does not use a conventional input full bridge rectifier, which saves on the need for input diodes. In addition, with a nearly 50% duty cycle switching of the active switches, high efficiency of the resonant section and a total overall higher efficiency is realized in accordance with the teachings of the present invention.

It is appreciated that an additional advantage of the new topology of an off line resonant converter with power factor correction in accordance with the teachings of the present invention is the compatibility of the frequency controlled power delivery of a boost converter with a resonant converter. For instance, a specific example of an LLC converter is described in this disclosure for explanation purposes. In one example, the compatibility of power delivery characteristic versus controlled switching frequency in DCM operation of boost would be valid for a predefined band of the ac input voltage. In one example, the frequency control of a DCM boost converter would have a good feasible compatibility with an LLC resonant converter for the ac input line voltage range of 80-150 V rms.

To illustrate, FIG. 1 is a block diagram illustrating generally one example of a resonant converter 100 in accordance with the teachings of the present invention. As shown in the depicted example, resonant converter 100 includes a boost storage inductance circuit 120 that is coupled to an ac line 110 to receive a line voltage Vac 110. In one example, an output of boost storage inductance circuit 120 is a bidirectional pulsating current 121 coupled to switcher circuit 129. As shown in the example, an output of switcher circuit 129 is a square wave signal 135, which may sometimes be referred to a chopped square wave, and is coupled to be received by a resonant circuit 150 to generate a regulated output 170.

In a simple example, boost storage inductance circuit 120 could include a single inductor. In operation, with a high frequency switching action across the output of boost storage inductance circuit 120, whenever a switch is closed the line voltage Vac 110 is applied to an inductor included in boost storage inductance circuit 120. The boost storage inductance circuit is therefore charged with a linear ramp up current and when the switch is opened, the energy stored in boost storage inductance circuit 120 is discharged with a linear ramp down current, resulting in the pulsating current in each switching cycle. In one example, during the positive half cycles of line voltage Vac 110, the pulsating current flows from boost storage inductance circuit 120 towards the switcher circuit 129, and during the negative half cycles of line voltage Vac 110, the pulsating current flows from the switcher circuit 129 towards the boost storage inductance circuit 120, which results in the bidirectional pulsating current 121 in each cycle of line voltage Vac 110. By designing the boost storage inductance 120 with a low enough inductance value, the stored energy is always completely discharged and the ramp down current reaches zero before the end of each switching cycle. In addition, by designing the boost storage inductance 120 with a low enough inductance value, the next charging ramp up current always starts from zero, which is referred to as a DCM or discontinuous conduction mode of operation.

As will be discussed, in one example, the switcher circuit 129 includes two active bidirectional switching devices that are switched in a narrow frequency band with complementary switching signals having a nearly 50% duty cycle. In one example, the switching scheme of the switcher circuit 129 creates a square wave signal 135 having square wave voltage pulses with nearly a 50% duty cycle, which are received by the resonant circuit 150. In one example, the switching scheme of switcher circuit 129 also causes switcher circuit 129 to alternately store energy to and receive energy from the boost storage inductance circuit 120 with the current pulses of the bidirectional pulsating current 121. In one example, resonant circuit 150 may include an isolation transformer and an output rectifier, which results in a dc output 170. The resonant circuit 150 could be implemented in a variety of different ways. In one example, resonant circuit 150 is implemented with an LLC resonant operating above resonance with leading sinusoidal current that results in zero voltage switching ZVS of the active switches in accordance with the teachings of the present invention.

Figure 2A:
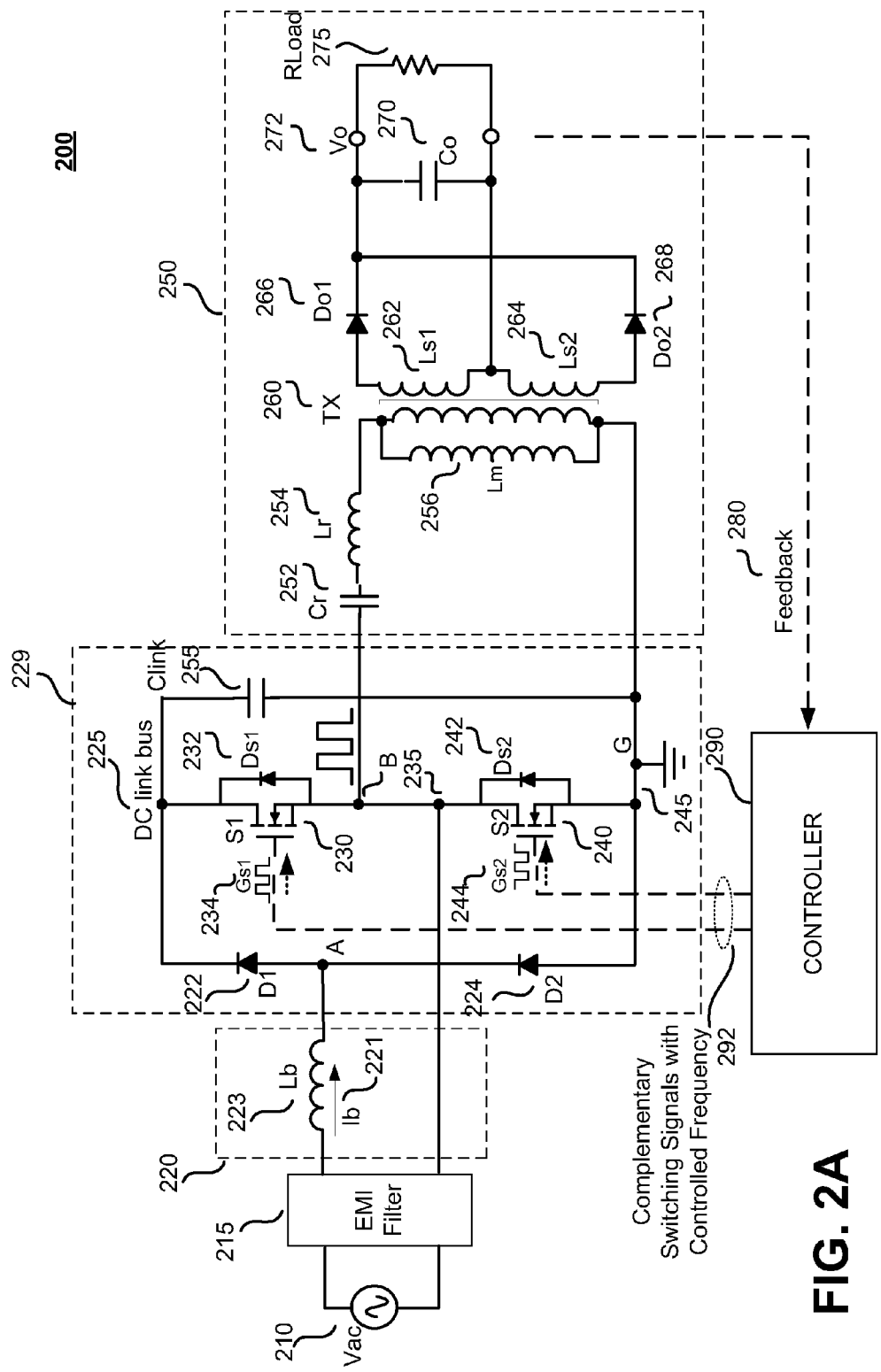
FIG. 2A is a schematic showing additional detail of one example of a resonant converter in accordance with the teachings of the present invention.

FIG. 2A is a schematic showing additional detail of one example of a resonant converter 200 in accordance with the teachings of the present invention. As shown, FIG. 2A shows the input ac line Vac 210 through the EMI filter 215 is coupled to a boost inductor Lb 223 of a boost storage inductance circuit 220. As shown, two stacked passive unidirectional switching devices, which are illustrated for example as two rectifier diodes D1 222 and D2 224, are at an input of switcher circuit 229 and are coupled to the boost storage inductance circuit 220. In one example, diodes D1 222 and D2 224 are each responsible for positive and negative half line cycles, respectively. In addition, two stacked active bidirectional switching devices are also included, which are illustrated for example as upper and lower MOSFET switches S1 230 and S2 240, and are coupled to the two stacked passive unidirectional switching devices D1 22 and D2 224 as shown. The upper bidirectional switching device includes a switch S1 230 and the anti-parallel substrate diode DS1 232. The lower bidirectional switching device includes a switch S2 240 and the anti-parallel substrate diode DS2 242. Furthermore, a link capacitance is also included, which is illustrated for example as capacitor Clink 255 coupled across the stacked active bidirectional switching devices S1 230 and S2 240, between DC link bus 225 and a reference potential terminal 245, which may also be referred to as ground, as shown.

In the illustrated example, switching signals Gs1 234 and Gs2 244 are coupled to be received by the gates of the upper and lower bidirectional switching devices, respectively. In one example, switching signals Gs1 234 and Gs2 244 are complementary signals with nearly 50% duty cycles that provide a small dead gap between the turn on times of each switch and the turn off times of the other respective switch to prevent any overlapping short circuit at the DC link bus 225. In the example depicted in FIG. 2, the return path of the resonant circuit 250 is coupled to reference potential 245. As shown in the example depicted in FIG. 2A, the source of switch S2 240 is also coupled to reference potential 245. In operation, the switching action of switch S1 230 and switch S2 240 results in a square wave signal, such as for example a chopped square wave, that is coupled to be received at the input port of resonant circuit 250 between node 235 and reference potential 245 to generate an output Vo 272 to be coupled to be received by load RLoad 275. In the illustrated example, the square wave signal at the input port of resonant circuit 250 between node 235 and reference potential 245 is a square wave that includes a dc voltage component modulated with an ac symmetric voltage component. The dc component of the input voltage to resonant circuit 250 is blocked by the resonant capacitor Cr 252 and the fundamental sinusoidal waveform of the ac component may be used to analyze the resonant circuit behavior in the frequency domain.

During a half cycle of input ac line Vac 210 having a positive polarity, the boost inductor 233 is charged whenever the upper bidirectional switching device, including either diode DS1 232 or switch S1 230, conducts, which results in input voltage being applied on the boost inductor Lb 223. When switch S1 230 is opened and current is conducted through to the lower bidirectional switching device, including either diode DS2 242 or switch S2 240, the boost inductor discharges to the DC link bus capacitance Clink 255 and/or to the resonant circuit 250. During a DCM operation of boost inductor 223, the stored energy is completely discharged and the current pulses Ib 221 through boost inductor 223 reach zero before the end of a switching cycle and the start of the next switching cycle. The transfer of current from each switching device S1 230 and S2 240 to the other respective switch device, or change of current direction in each switching device S1 230 and S2 240 from body diode conduction to the switch conduction, each would define a new interval of operation that will be described in further detail below with respect to the equivalent circuit diagrams of FIG. 3 and FIG. 4.

In the example illustrated in FIG. 2A, the LLC resonant tank circuit shown in resonant circuit 250 includes resonant inductor Lr 254 and resonant capacitor Cr 252, which define a series resonant frequency, $1/(2\pi\sqrt{LrCr})$. In one example, high frequency power transformer TX 260 transfers the sinusoidal resonance oscillations from the primary side to the secondary side of transformer TX 260. As shown in the illustrated example, the secondary side can be formed by a center tapped secondary winding coupled to two diode rectifiers Do1 266 and Do2 268 to generate a regulated dc output. In another example, the secondary can also be formed by a single winding coupled to a bridge rectifier to generate a regulated dc output.

The transferred sinusoidal resonance oscillations are rectified. The rectified sinusoidal resonance oscillations from diode rectifiers Do1 266 and Do2 268 are then filtered through the output bulk capacitor Co 270, which creates the regulated dc output voltage V0 272 that is applied to the load RLoad 275.

In the example illustrated in FIG. 2A, the leakage inductance of primary winding can be utilized as at least part of Lr 254. In one example, the magnetizing inductance of the transformer Lm could be also utilized in combination with Lr for resonance at lower loads. Therefore, the LLC resonant circuit illustrated in FIG. 2A includes a resonant capacitance Cr 252, a first resonant inductance Lr 254 forming a series resonant frequency, and a second resonant inductance Lm 256 forming a parallel resonant frequency. As shown in the example illustrated in FIG. 2A, the first resonant inductance in the LLC resonant circuit includes at least a leakage inductance Lr 254 and the second resonant inductance in LLC resonant circuit includes at least a magnetizing inductance Lm 256 of the transformer TX 260. In one example, the transformer TX 260 has a turns ratio adapted to scale the voltage level of the output of the resonant converter as well as provide isolation between the primary and secondary sides of the transformer TX 260. Utilization of the leakage and magnetizing inductances of the transformer TX 260 as part of the resonant components saves on the board cost, size, weight and could reduce component count.

As shown in the example illustrated in FIG. 2A, a controller 290 is coupled to receive the feedback signal 280 that is representative of the output of resonant circuit 250. In operation, controller 290 generates switching signals 292 in response to the feedback signal 280 to regulate the output Vo 270. In one example, switching signals 292 are complementary switching signals with a controlled frequency with nearly 50% duty cycle and include switching signals Gs1 234 and Gs2 244 that are coupled to drive switch S1 230 and switch S2 240, respectively.

Typically, an LLC converter is designed to operate in a narrow band of frequency control above the parallel resonant frequency with a negative gain, which means that an increase in frequency decreases the energy transferred to the output. In this region of operation, the power train appears as inductive with resonant current lagging the tank input voltage that results in advantage of zero voltage switching (ZVS). The advantage of reduced switching loss due to the eliminated loss for switch turn on and diode reverse recovery, which improves efficiency, is one of attractions of LLC converter topology. In an LLC converter designed to operate in the proper region, the line and load regulation can be achieved while frequency varies in a narrow range around the series resonant frequency with high gain and high slope. When the load decreases, the voltage gain is reduced and switching frequency increases and by resonating faster, less power would be transferred to the secondary side.

Figure 2B:
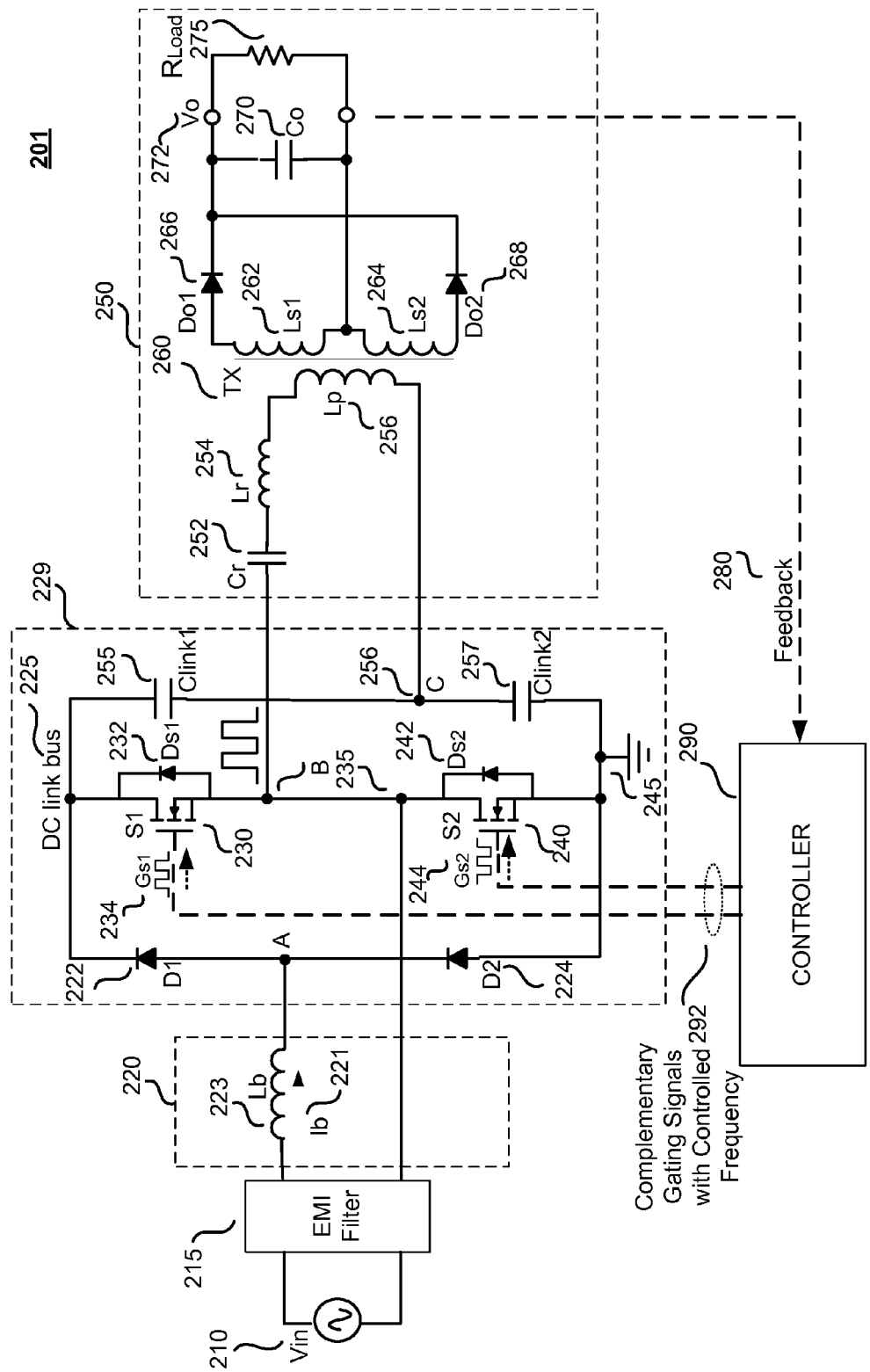
FIG. 2B is a schematic showing additional detail of another example of a resonant converter in accordance with the teachings of the present invention.

FIG. 2B is a schematic showing additional detail of another example of a resonant converter 201 in accordance with the teachings of the present invention. As can be appreciated, resonant converter 201 of FIG. 2B shares many similarities with resonant converter 200 of FIG. 2A. For example, switcher circuit 229 includes upper bidirectional switching device switch S1 230 in parallel with its substrate diode DS1 232. The lower bidirectional switching device includes switch S2 240 in parallel with its substrate diode DS2 242. The switching signals Gs1 234 and Gs2 244 of switching signals 292 generated by controller 290 are coupled to be received by the gates of upper and lower bidirectional switching devices S1 230 and S2 240, respectively, are complementary signals with nearly 50% duty cycles and include a small dead gap between the turn on of each switch and the turn off of the other respective switch to prevent overlapped turn on times.

One difference between resonant converter 201 of FIG. 2B and resonant converter 200 of FIG. 2A is that resonant converter 201 of FIG. 2B includes two series coupled capacitors Clink1 255 and Clink2 257 stacked between the DC link bus 225 and reference potential 245 with a center point 256. In example resonant converter 201, the return path of the resonant circuit 250 is coupled to center point 256 between the stacked capacitors Clink1 255 and Clink2 257. In the example, the center point 256 between the stacked capacitors Clink1 255 and Clink2 257 provides a reference potential node for the switcher circuit 229. When compared to resonant converter 200 of FIG. 2A, the switching action of the two bidirectional switching devices S1 230 and S2 240 generates an ac symmetric square wave with reference to the center point 256 between stacked series coupled capacitors Clink1 255 and Clink2 257. As a result, the ac symmetric square wave at the input port of the resonant circuit 250, between node 235 and reference potential 245 does not include any dc component to be blocked with capacitor Cr 252 of the resonant circuit 250. The fundamental of such a symmetric square waveform used in the frequency domain analysis is expressed by:

$$v\text{fund}(t) = Vm1 \cdot \sin(\omega t);$$

where $Vm1 = (2/\pi) \cdot V(\text{DC link bus})$.

As shown in the depicted example, transformer TX 260 of resonant circuit 250 includes a primary magnetizing inductance Lp 256 and a secondary including center tapped windings Ls1 262 and Ls2 264. Rectifier diodes Do1 266 and Do2 268 are coupled to center tapped windings Ls1 262 and Ls2 264 and are filtered by output bulk capacitor Co 270 to provide the dc regulated output Vo 272 to be coupled to load RLoad 275. A feedback signal 280 representative of output Vo 272 is coupled to be received by controller 290, which generates switching signals 292 in response to feedback signal 280 to regulate the output of the resonant converter 201. In one example, switching signals 292 include switching signals 234 and 244, which are coupled to drive switch S1 230 and switch S2 240, respectively.

Figure 3A:
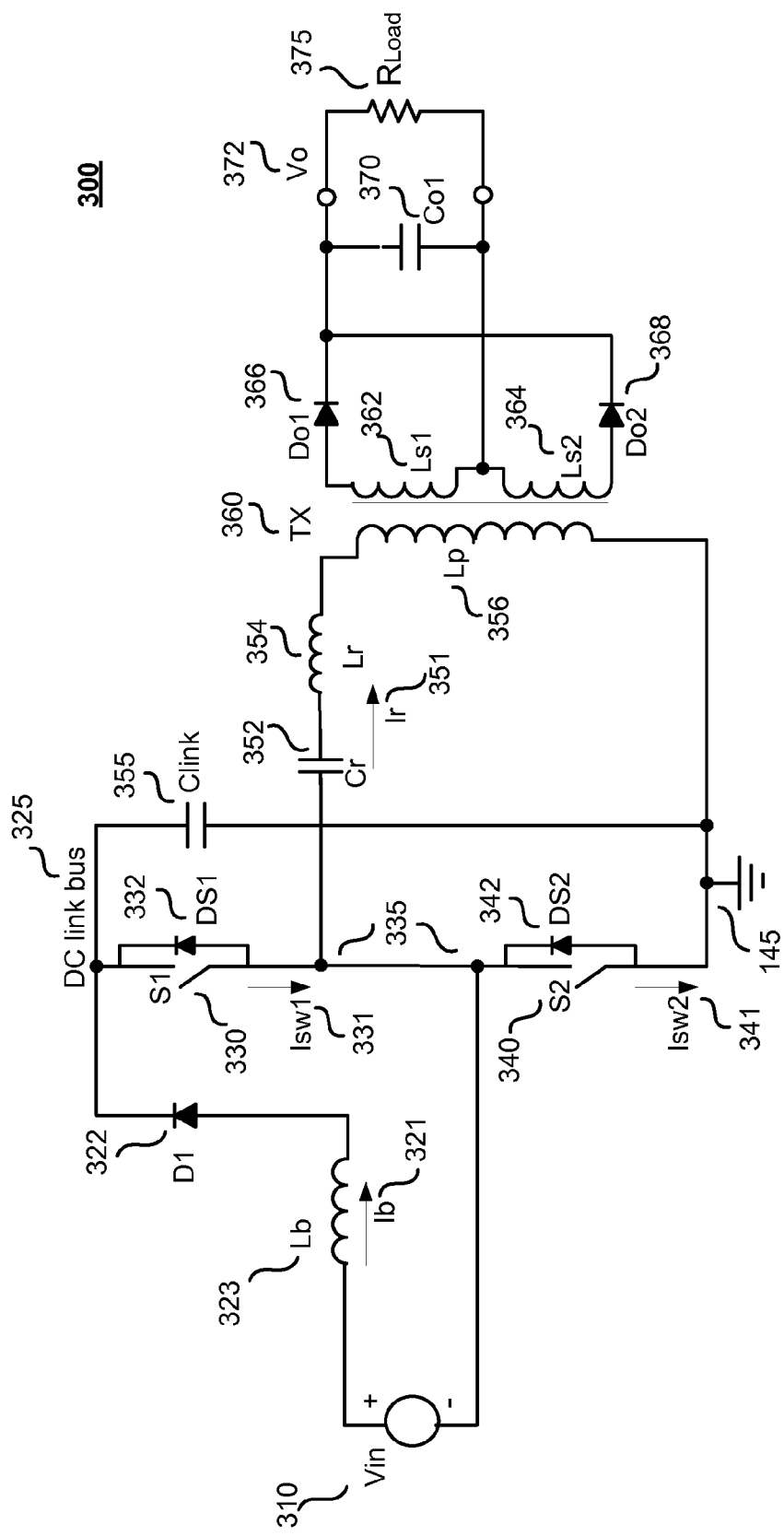
FIGS. 3A to 3E illustrate examples of equivalent circuit diagrams of the schematic shown in FIG. 2A during a positive half cycle of an input ac line and four successive intervals of operation based on the conduction of each switching device in accordance with the teachings of the present invention.

FIGS. 3A to 3E illustrate examples of a resonant converter 300, which is equivalent to the example resonant converter 200 illustrated in the schematic shown in FIG. 2A during a positive half cycle of an input ac line and four successive intervals of operation based on the conduction of each bidirectional switching device in accordance with the teachings of the present invention. In particular, FIG. 3A presents a general equivalent circuit diagram of a resonant converter 300, which corresponds to the example resonant converter 200 illustrated in FIG. 2A during an input ac line positive half cycle, which is when diode D1 322 is active and operates with the two stacked bidirectional switching devices, that in one example are MOSFET S1 330 and S2 340 and their substrate anti-parallel diodes DS1 332 and DS2 342 respectively. It is appreciated that diode D2 324 has no role in positive line cycle in conduction and for the sake of simplicity is not shown in the equivalent circuit diagram of FIGS. 3A to 3E during the line positive half cycle.

The switching action generates intervals of operation for the PFC section integrated with the resonant section, which will be described below in FIGS. 3B to 3E with respect to 4 successive intervals. In particular, FIGS. 3B to 3E show the simplified equivalent resonant converter 300 for each interval of operation during a positive ac line cycle, which is when only diode D1 322 conducts. Based on the boost current Ib 321 direction and the resonant current Ir 351 direction, only one of the switches S1 330 and S2 340 or their corresponding substrate anti-parallel diodes DS1 332 or DS2 342 conducts. In the illustrated intervals shown in FIGS. 3B to 3E, the conducting device is indicated with a solid line and the path of the non-conducting devices is indicated with dotted line.

In addition, the positive sign direction of the current Ib 321 in the boost inductor 323, the currents Isw1 331 and Isw2 341 in the bidirectional switching devices S1 330 and S2 340, and the resonant current Ir 351 in the resonant circuit are all illustrated in the circuit diagram of FIG. 3A for reference. In each of these simplified equivalent circuit diagrams illustrated in FIGS. 3B to 3E, the directions and signs of the current flows that are shown in the figure is based on the positive direction referenced in FIG. 3A. In all the example intervals illustrated below, the transfer of energy to secondary windings Ls1 362 or Ls2 364 and to the load RLoad 275 are through one of the center tapped diodes Do1 366 or Do2 368, based on direction of primary resonant current in accordance with the teachings of the present invention.

Figure 3B:
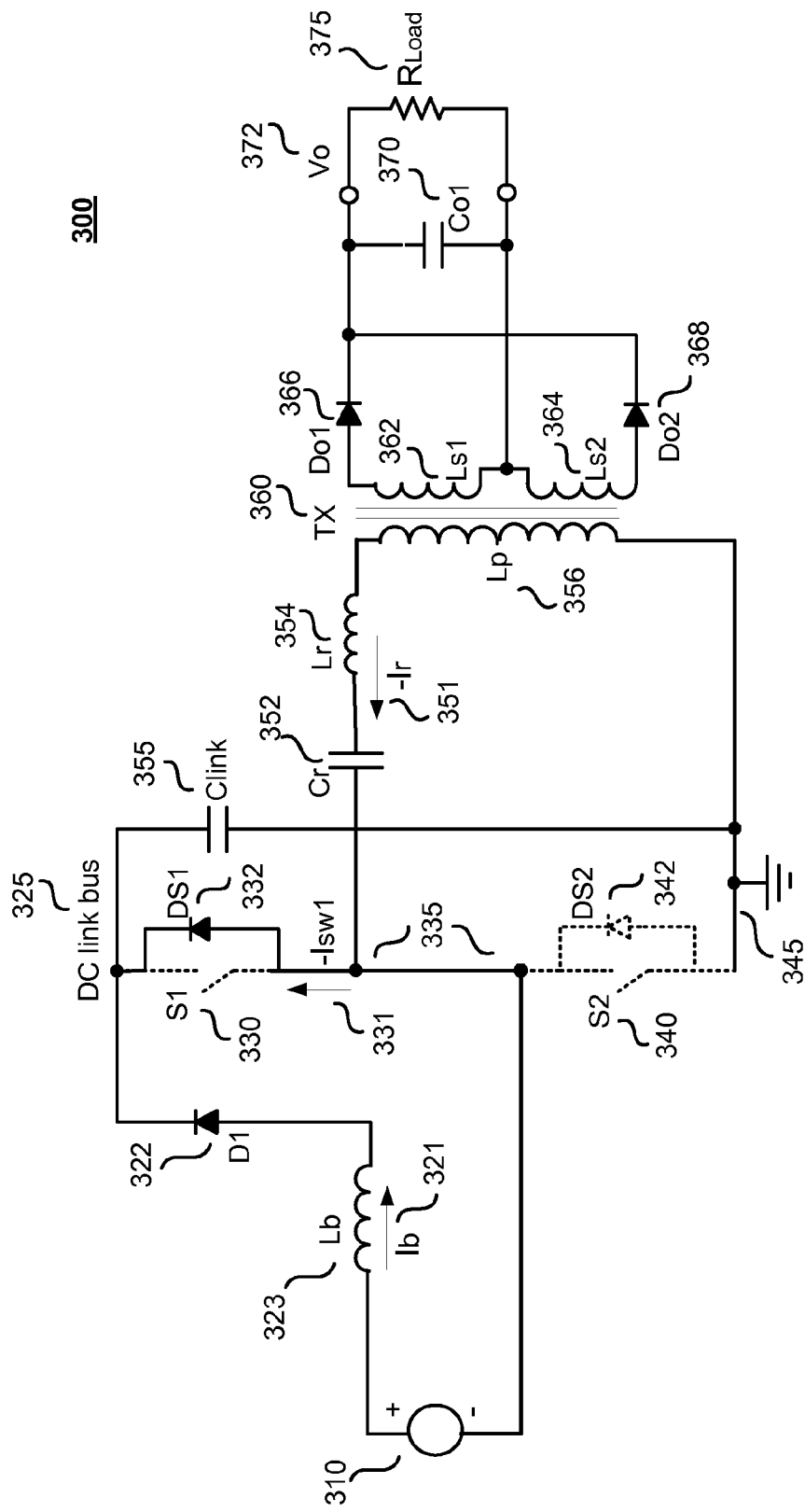

In the example illustrated in FIG. 3B, resonant converter 300 is illustrated during a first interval, which is when the resonant current Ir 351 flows in a negative direction and therefore passes through upper substrate diode DS1 332 to the DC link bus 325 and link capacitance Clink 355. Current through the diode DS1 332 causes the input line source 310 to be applied only across the boost inductor Lb 323. Boost inductor Lb 323 starts charging with linear current Ib 321 (which will correspond to waveform 522 in FIG. 5 below). Current through substrate diode DS1 332 brings the voltage across the switch S1 330 to zero and switch S1 330 can turn on with zero voltage switching ZVS in accordance with the teachings of the present invention.

Figure 3C:
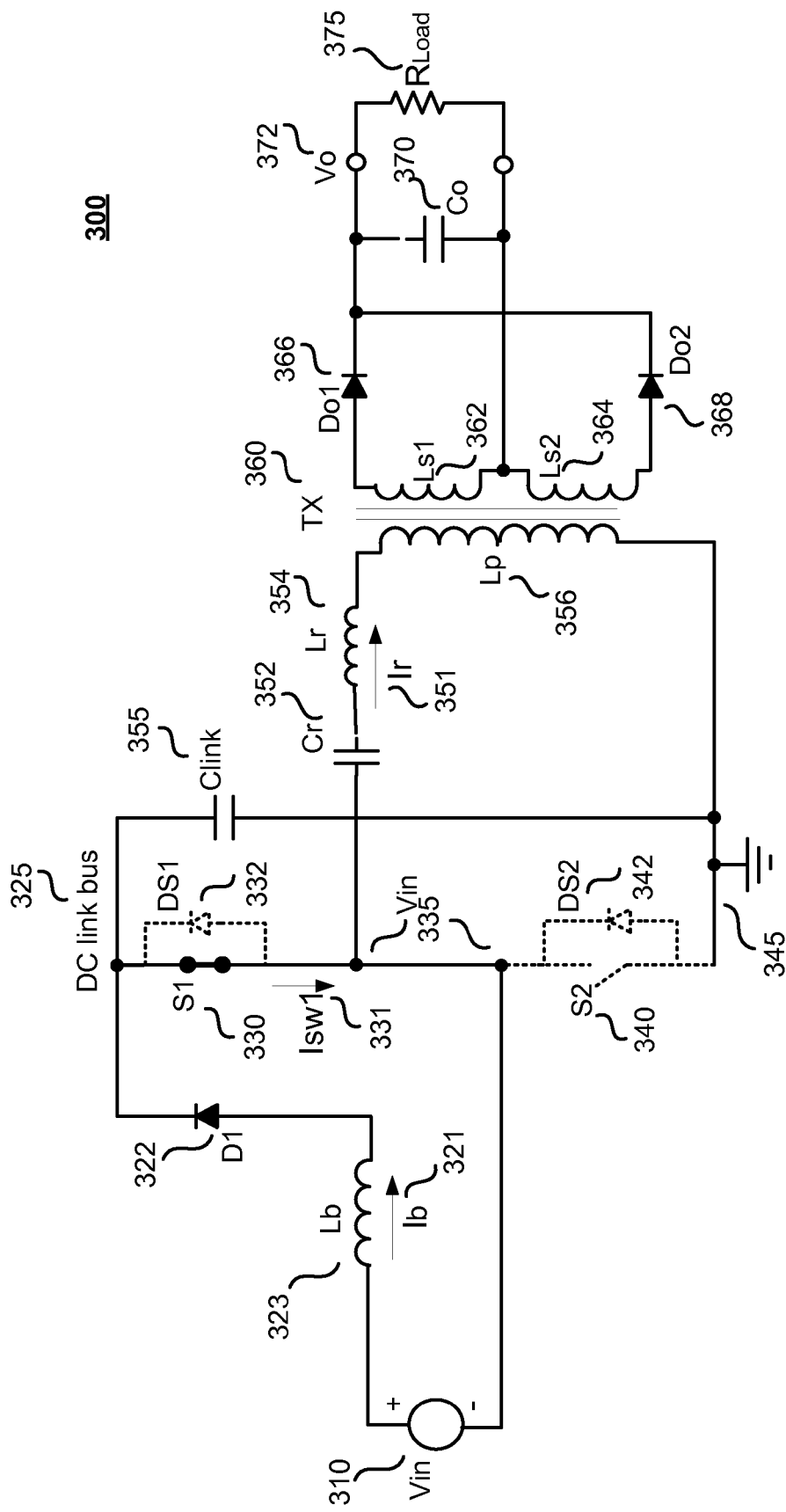

In the example illustrated in FIG. 3C, resonant converter 300 is illustrated during a second interval, which is when switch S1 330 is turned on, oscillating resonant current Ir 351 has changed direction, and DC link bus voltage 325 is applied to the resonant input node 335, transferring energy from link capacitance Clink 355 to the resonant tank as shown. However, boost inductor Lb 320 still continues to be charged during the second interval and the current Ib 321 increases linearly. At the end of this second interval, switch S1 330 turns off.

Figure 3D:
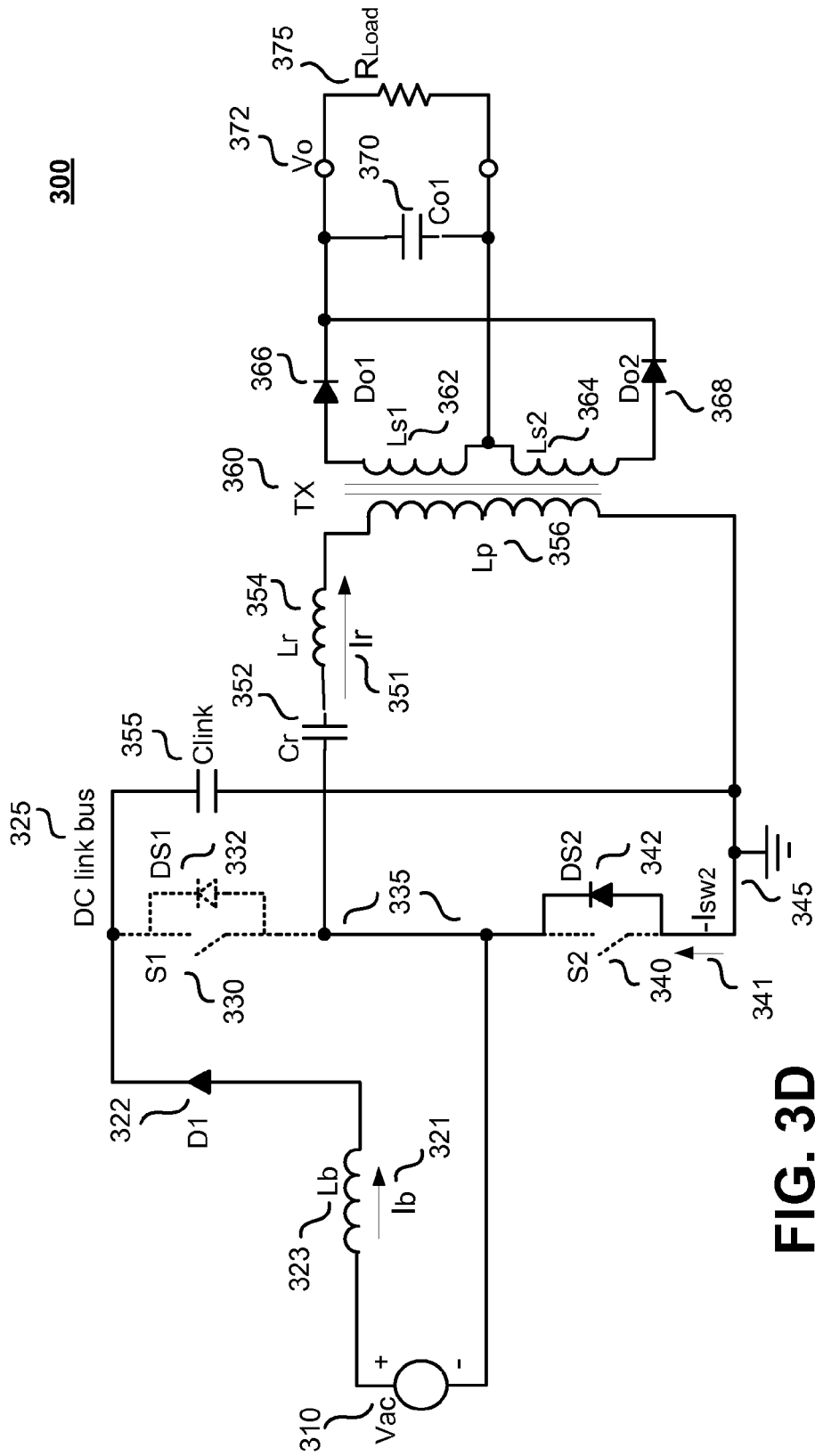

In the example illustrated in FIG. 3D, resonant converter 300 is illustrated during a third interval, which begins at the moment when switch S1 330 has turned off and because of the direction of oscillating resonant current Ir 351, the Isw2 341 current flows through the substrate diode DS2 342 of the lower bidirectional switching device S2 340, providing a condition of zero voltage switching (ZVS) turn on for switch S2 340. As the short across the boost inductor Lb 323 is removed, the stored energy in the boost inductor Lb 320 discharges linearly through diode D1 322 and DC link bus 325 to the link bus capacitance Clink 355. In this interval, the resonance current circulates in the resonant tank through DS2 342.

Figure 3E:
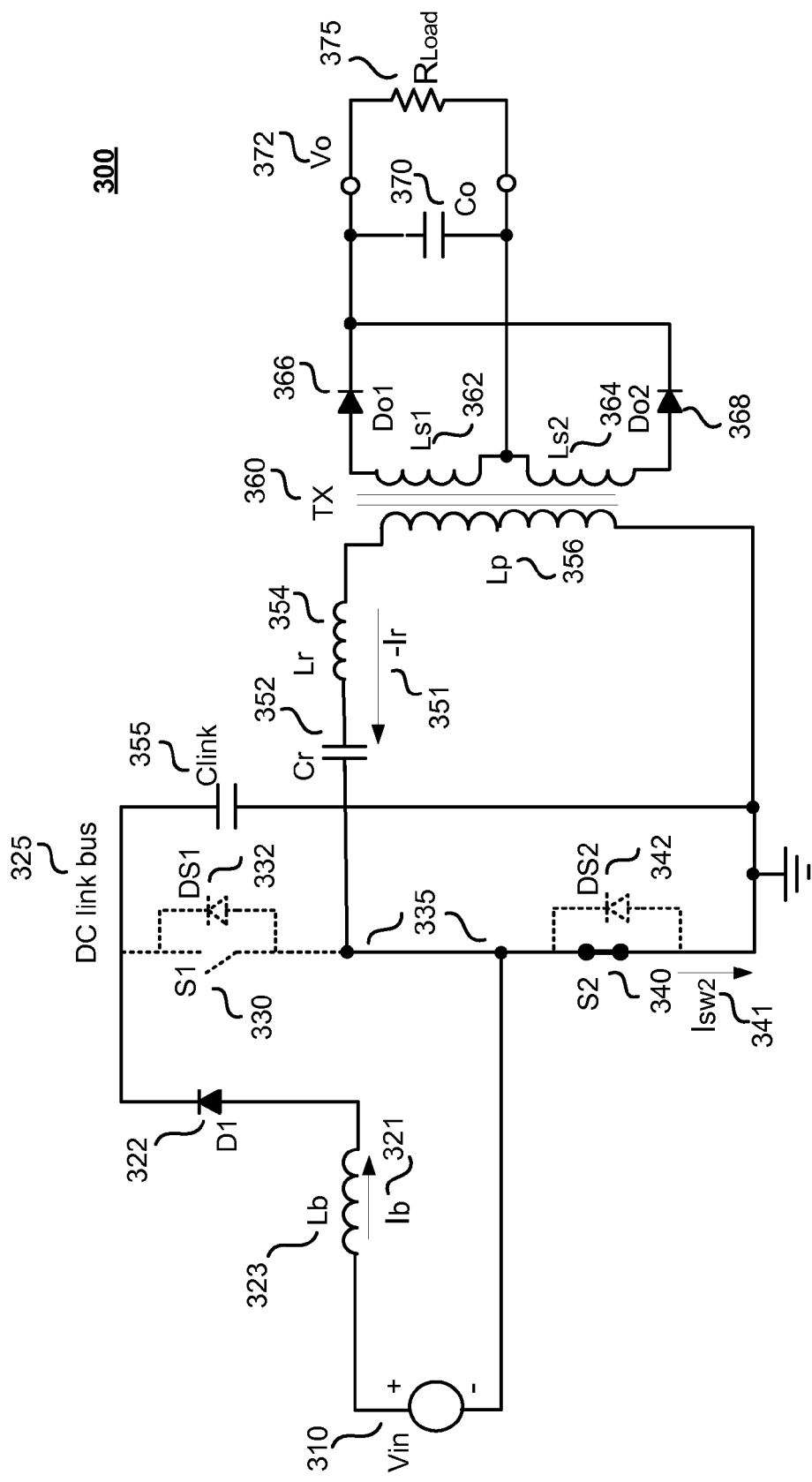

In the example illustrated in FIG. 3E, resonant converter 300 is illustrated during a fourth interval, which shows that switch S2 340 is turned on with ZVS and the oscillating resonant current Ir 351 has changed direction passing through switch S2 340. Boost inductor Lb 320 continues to discharge and its current Ib 321 decreases linearly until at some point during this interval it reaches zero and remains at zero until the start of next switching cycle. In DCM operation of boost, the switching frequency and the duty cycle are kept nearly constant over one ac line cycle. Due to the characteristic of discontinuous current pulses in the boost inductor Lb 323, the average of each pulse after filtration of ripple by the input line filter follows the input voltage, which results in a natural power factor correction. However, because of the nearly 50% duty cycle (considering the dead gap in each switching cycle), the DC link bus voltage 325 could rise in one example to over twice the maximum input voltage.

FIGS. 4A to 4E illustrate examples of the resonant converter 300, which is equivalent to the example resonant converter 200 illustrated in the schematic shown in FIG. 2A during a half cycle of an input ac line having a negative polarity and four successive intervals of operation based on the conduction of each bidirectional switching device in accordance with the teachings of the present invention. It is appreciated resonant converter 300 illustrated in FIGS. 4A to 4E, are therefore also equivalent to the resonant converter 300 described in FIGS. 3A to 3E. With respect to the resonant converter 300 shown in FIG. 4A, during the input ac line negative half cycle diode D2 324 operates with the two stacked bidirectional switching devices S1 330 and S2 340 and their respective substrate anti-parallel diodes DS1 332 and DS 342. It is appreciated that diode D1 321 has no role in negative line cycle in conduction and for the sake of simplicity is not shown in the equivalent circuit diagram of FIGS. 4A to 4E during the line negative half cycle.

The switching action generates intervals of operation for the PFC section integrated with the resonant section, which will be described below in FIGS. 4B to 4E with respect to 4 successive intervals. In particular, FIGS. 4B to 4E show the simplified equivalent resonant converter 300 for each interval of operation during a negative ac line cycle, which is when only diode D2 324 conducts. Based on the boost current Ib 321 direction and the resonant current Ir 351 direction in each interval, only one of the switches S1 330 or S2 340 or their corresponding substrate anti-parallel diodes DS1 332 or DS2 342 conducts. In the illustrated intervals shown in FIGS. 4B to 4E, the conducting device is indicated with solid line and the path of the non-conducting devices is indicated with dotted line.

Figure 4A:
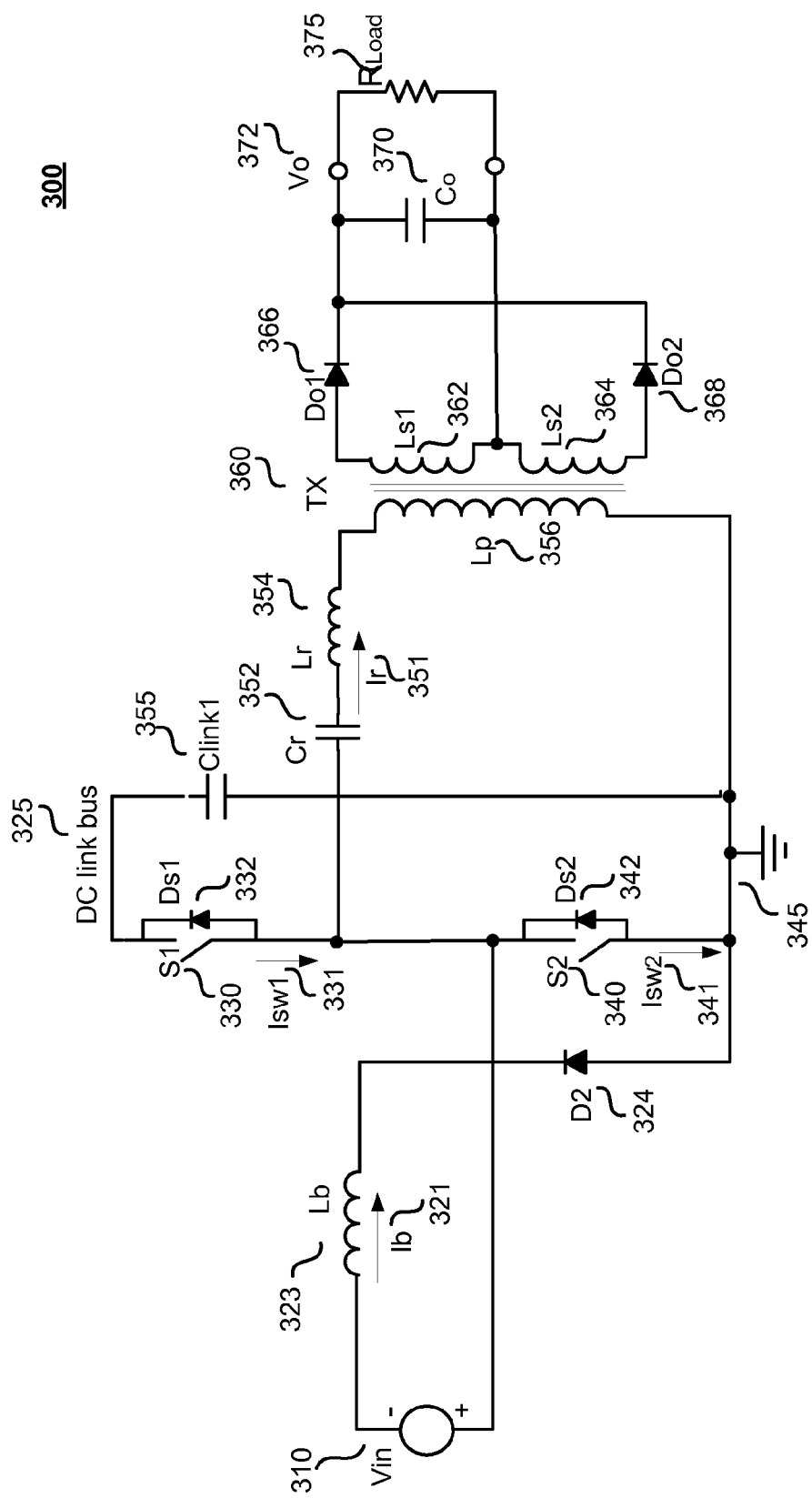
FIGS. 4A to 4E illustrate examples of equivalent circuit diagrams of the schematic shown in FIG. 2A during a negative half cycle of an input ac line and four successive intervals of operation based on the conduction of each switching device in accordance with the teachings of the present invention.

In addition, the positive sign direction of the current Ib 321 in the boost inductor 323, the currents Isw1 331 and Isw2 341 in the bidirectional switching devices S1 330 and S2 340, respectively, and the resonant current Ir 351 in the resonant circuit are all illustrated in the circuit diagram of FIG. 4A for reference. In each of these simplified equivalent circuit diagrams illustrated in FIGS. 4B to 4E, the direction and sign of the current flow is based on the positive direction referenced in FIG. 4A. It is appreciated that based on the direction of the primary resonant current transfer of energy to the secondary winding and to the load is similar to that which was explained previously with respect to FIGS. 3A to 3E through the center tapped diodes Do1 366 or Do2 368.

Figure 4B:
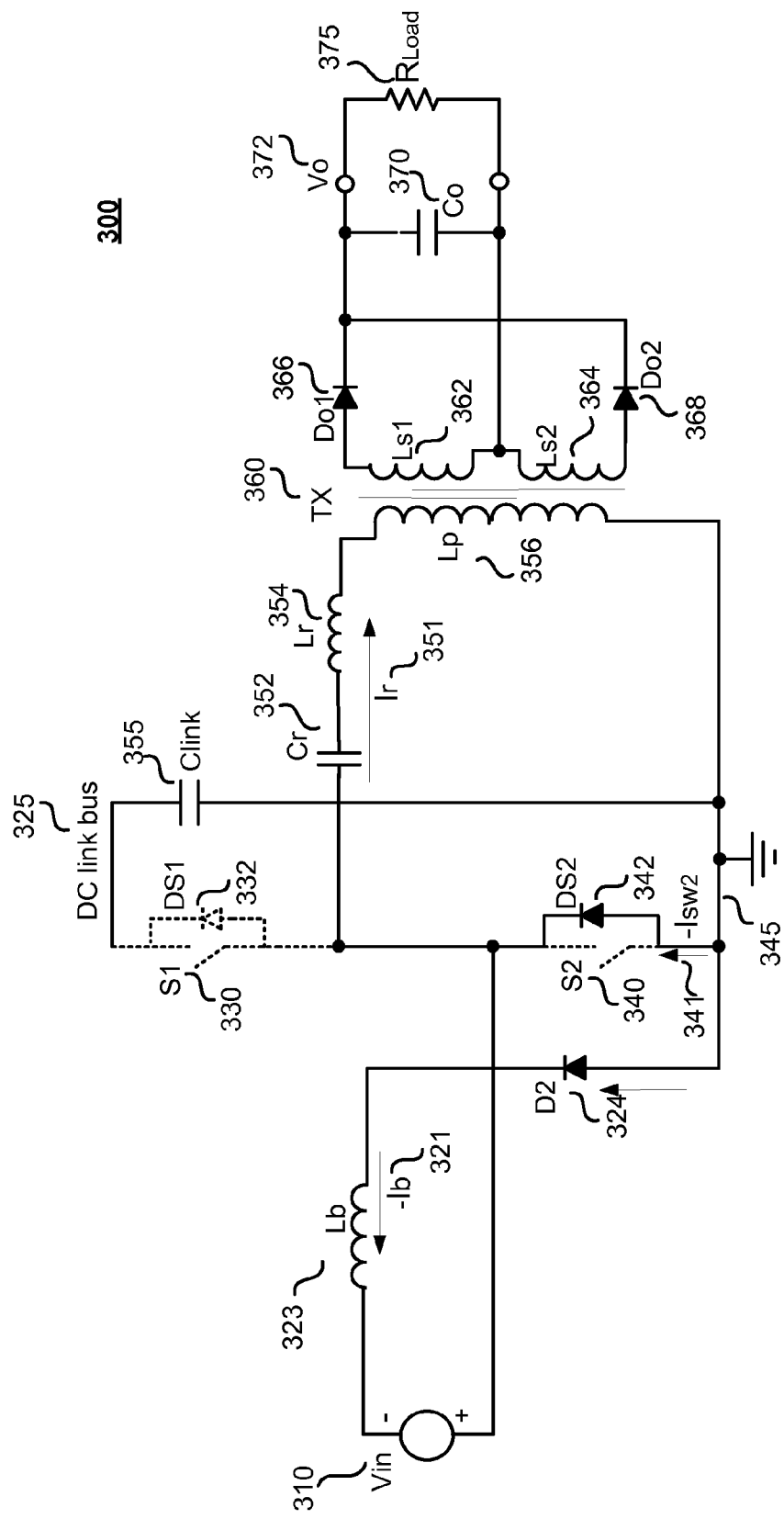

In the example illustrated in FIG. 4B, resonant converter 300 is illustrated during a first interval, which is when the resonant current Ir 351 flows in a positive direction and therefore passes through lower substrate diode DS2 342, which in combination with diode D2 324 shorts the input line source 310 across the boost inductor Lb 323, which is thus charged linearly in the negative direction with current Ib 321. Current through substrate diode DS2 342 brings voltage across the switch S2 340 to zero and can therefore be turned on with zero voltage switching ZVS. In this interval the resonance current circulates in the resonant tank through DS2 342.

Figure 4C:
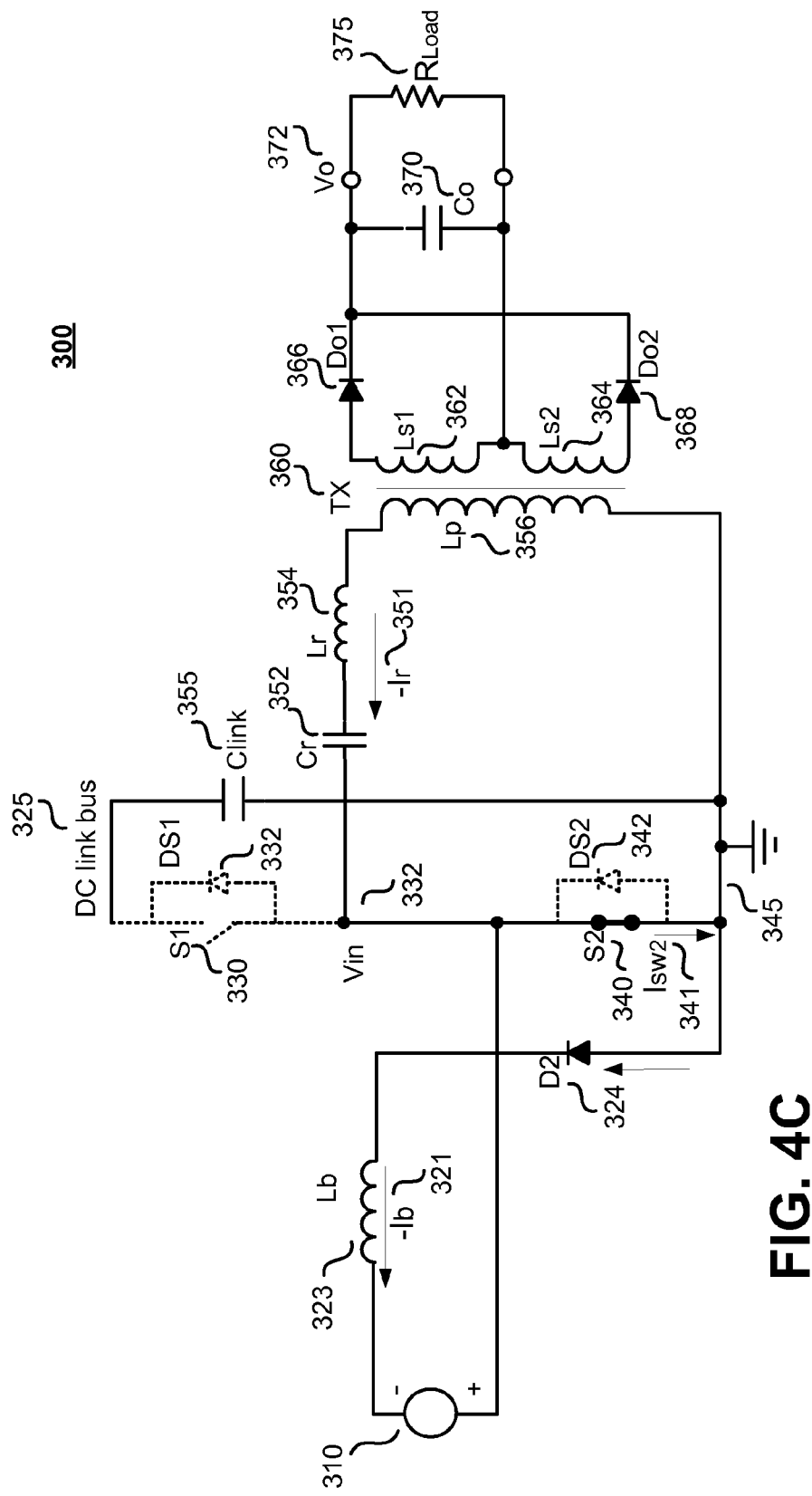

In the example illustrated in FIG. 4C, resonant converter 300 is illustrated during a second interval, which is when switch S2 340 has turned on, the resonant current Ir 351 has changed to a negative direction, and the resonance current is still circulating in the resonant tank through S2 340. However, boost inductor Lb 320 still continues to be charged during the second interval and the current Ib 321 increases linearly in negative direction. At the end of this second interval, switch S2 340 turns off.

Figure 4D:
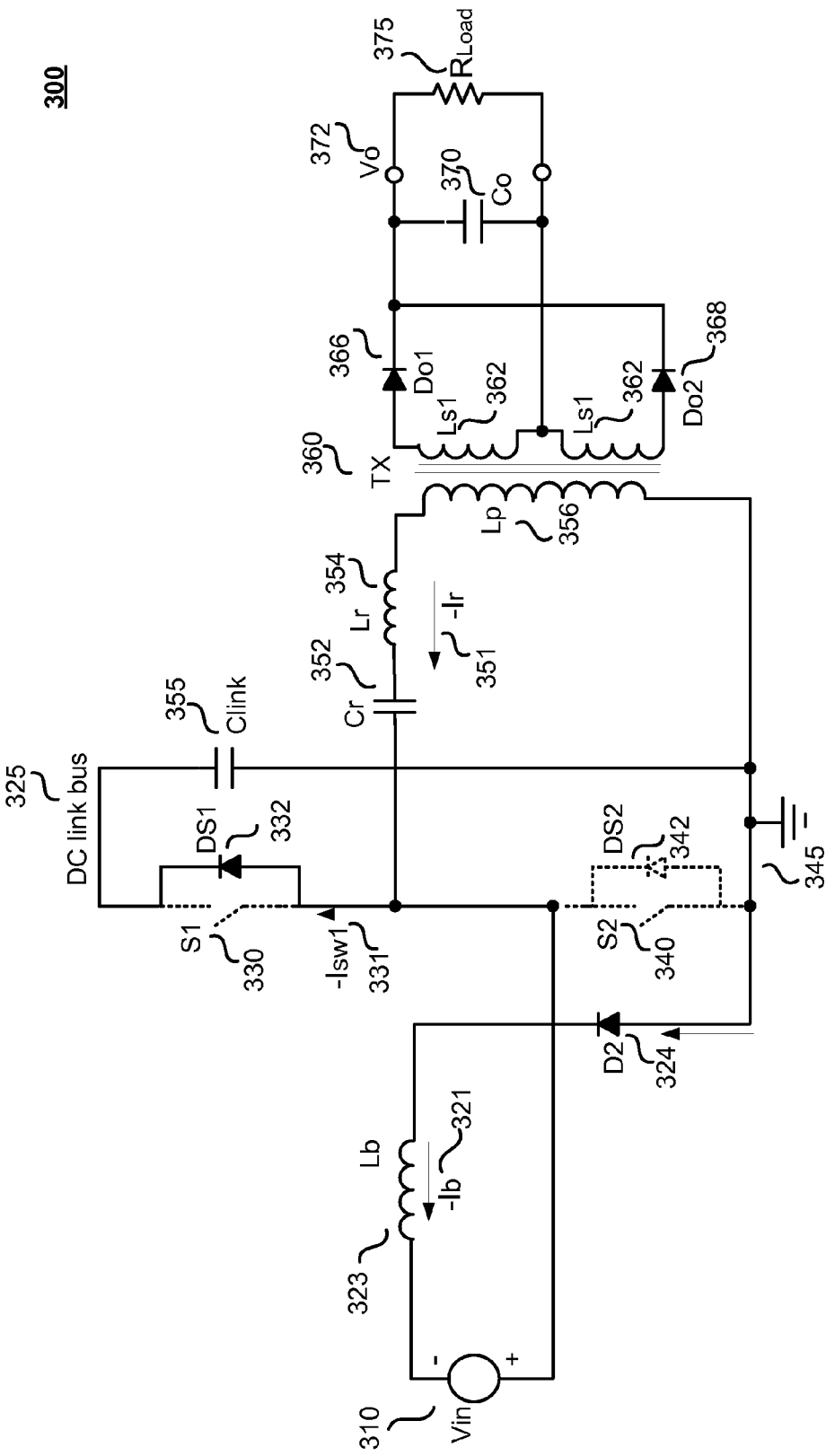

In the example illustrated in FIG. 4D, resonant converter 300 is illustrated during a third interval in negative line cycle, which begins at the moment when switch S2 340 has turned off, and because oscillating resonant current Ir 351 still flows in the negative direction, resonant current Ir 351 flows through the substrate diode DS1 332 of the upper switching device S1 330, which provides a ZVS condition turn on for switch S1 330. As the short across the boost inductor Lb 323 is removed, the stored energy in the boost inductor Lb 320 discharges linearly through diode DS1 332 and the DC link bus 325 to the link bus capacitance Clink 355. In the illustrated interval, diode D2 324 provides return path as shown.

Figure 4E:
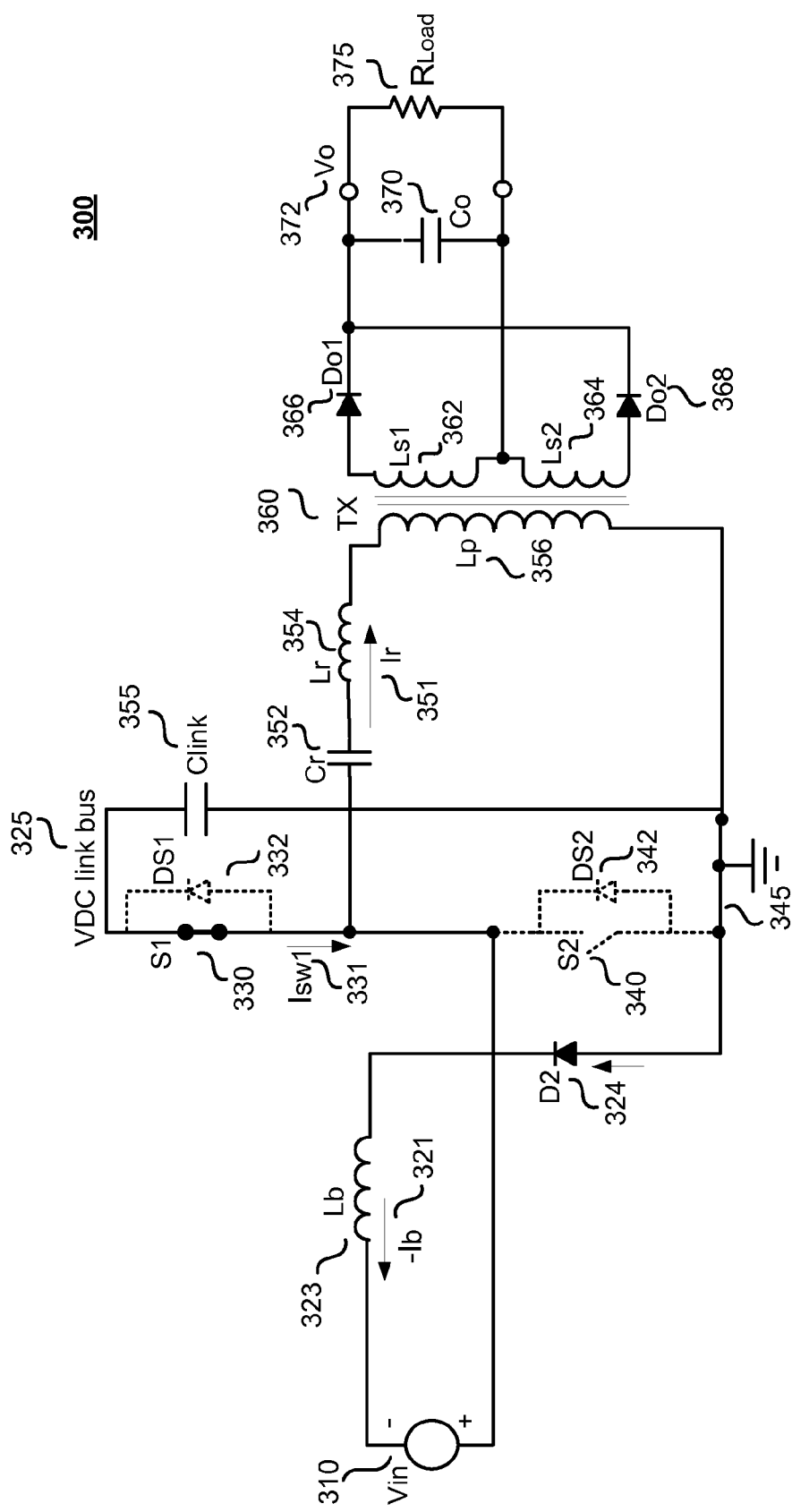

In the example illustrated in FIG. 4E, resonant converter 300 is illustrated during a fourth interval, which shows that switch S1 330 is turned on with ZVS and the oscillating resonant current Ir 351 has changed direction passing through switch S1 330. Boost inductor Lb, 320 continues to discharge linearly and at some point during this fourth interval, the current Ib 321 reaches zero and remains at zero until the start of the next switching cycle. In DCM operation of boost, the average of current pulses follows the input voltage and ripple is filtered by the input line filter, which results in a clean line current following the line voltage, In an example of sinusoidal line voltage, this results in sinusoidal line current.

Figure 5:
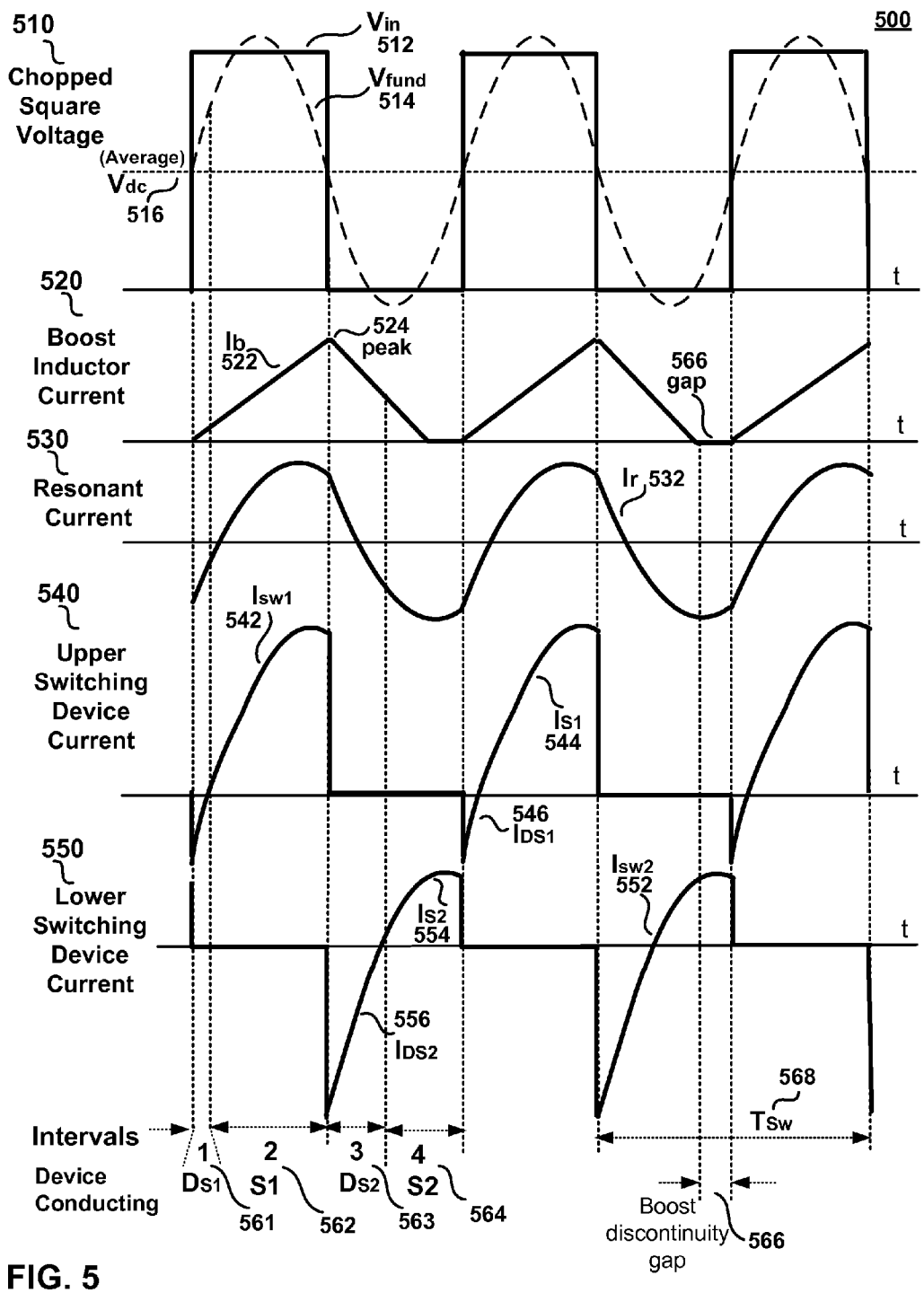
FIG. 5 shows example timing diagrams that illustrate several switching cycles of waveforms during a positive half cycle of an input ac line in accordance with the teachings of the present invention.

FIG. 5 shows example timing diagrams that illustrate several switching cycles of waveforms during a positive half cycle of an input ac line in accordance with the teachings of the present invention. As shown in the depicted example, chopped square voltage 510 illustrates the square wave pulses at the input port of resonant circuit. Boost inductor current 520 illustrates the boost inductor DCM current pulses. Resonant current 530 illustrates the resonant sinusoidal oscillatory current through the resonant inductor Lr and capacitor Cr. Upper switching device current 540 illustrates the current waveform through the upper bidirectional switching device (e.g., S1 330 and DS1 332 in FIGS. 3A to 3E), which includes the current through the substrate (body) diode DS1 and through the switch S1. Based on the predefined positive direction of current in the bidirectional switching device shown for example in FIG. 3A, the diode conducting current on the graph is illustrated as being negative and the current through the switch is illustrated as being positive. Lower switching device current 550 illustrates the current through the lower bidirectional switching device (e.g., S2 340 and DS2 342 in FIGS. 3A to 3E), which includes the current IDS2 556 through the substrate diode DS2 342 and the current IS2 554 through the switch S2 340. Based on the predefined positive direction of current in bidirectional switching device shown on FIG. 3A, the current IDS2 556 through the diode is illustrated as being negative and the current IS2 554 through the switch is illustrated as being positive.

As illustrated in the example depicted in FIG. 5, the periodic switching cycle is divided into the four intervals based on conduction through each device. In particular, the first interval 561 corresponds to when diode DS1 is conducting. The second interval 562 corresponds to when switch S1 is conducting. The third interval 563 corresponds to when diode DS2 is conducting. The fourth interval 564 corresponds to when switch S2 is conducting.

As illustrated in FIG. 5 with regard to the boost inductor current 520, during the first and second intervals, it charges and increases linearly. During the third interval and part of the fourth interval, it discharges and decreases linearly until the boost inductor current 520 reaches zero during the latter portion of the fourth interval, where it remains at zero during a discontinuity gap 566 as shown.

Figure 6:
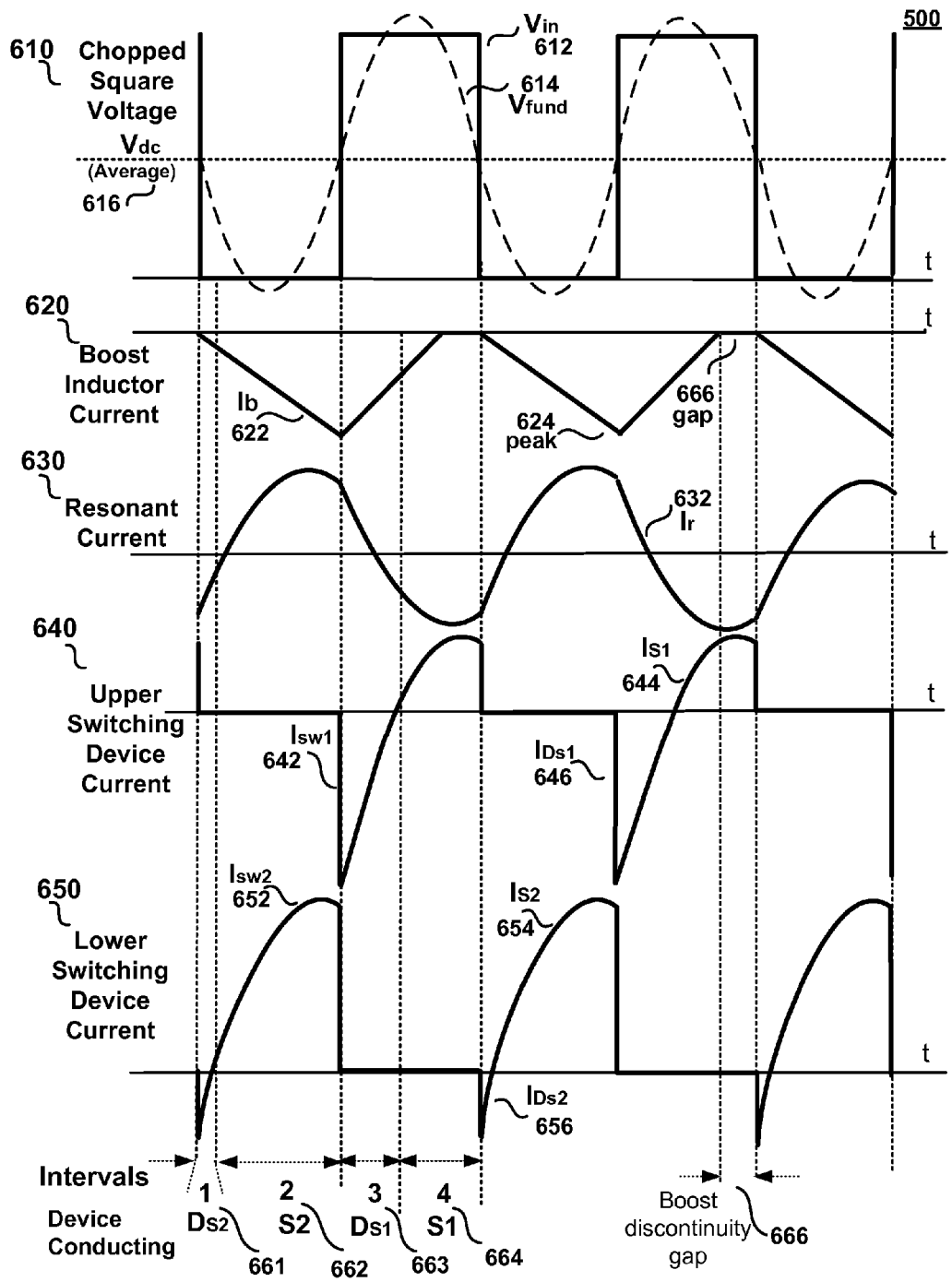
FIG. 6 shows example timing diagrams that illustrate several switching cycles of waveforms during a negative half cycle of an input ac line in accordance with the teachings of the present invention.

FIG. 6 shows example timing diagrams that illustrate several switching cycles of waveforms during a negative half cycle of an input ac line in accordance with the teachings of the present invention. As shown in the depicted example, chopped square voltage 610 illustrates the voltage square pulses at the input port of resonant circuit. Boost inductor current 620 illustrates the boost inductor DCM current pulses, which in spite of the positive half cycle of the line, the charging of the boost inductor during the first and second intervals happens when the input chopped square voltage is at zero level and the boost inductor current is pulsating in negative direction. Resonant current 630 illustrates the resonant sinusoidal oscillatory current through the resonant inductor Lr and capacitor Cr. Upper bidirectional switching device current 640 illustrates the current waveform through the upper bidirectional switching device (e.g., S1 330 and DS1 332 in FIGS. 4A to 4E), which includes the substrate diode current IDS1 646 in the negative direction and switch current IS1 644 in the positive direction. Lower bidirectional switching device current 650 illustrates the current Isw2 652 through the lower bidirectional switching device (e.g., S2 340 and DS2 342 in FIGS. 4A to 4E), which includes the current IDS2 656 through the substrate diode in negative direction and the current IS2 654 through the switch in positive direction.

As illustrated in the example depicted in FIG. 6, the periodic switching cycle is divided into the four intervals based on conduction through each device. In particular, the first interval 661 corresponds to when diode DS2 is conducting. The second interval 662 corresponds to when switch S2 is conducting. The third interval 663 corresponds to when diode DS1 is conducting. The fourth interval 664 corresponds to when switch S1 is conducting.

As shown in FIG. 6, the boost inductor current 620 is illustrated in a negative direction, charging with a linear negative increase during the first and second intervals and discharging with a linear negative decrease during the third interval 3 and part of the fourth interval. As shown in FIG. 6, boost inductor current 620 includes a discontinuity gap 666 with zero current during the latter portion of the fourth interval.

FIGS. 7A and 7B show diagrams that illustrate graphical relationships of power delivered with respect to frequency control in an example 16W designed and tested LLC resonant converter with DCM boost integration and merged line rectification in accordance with the teachings of the present invention. In particular, power delivery vs. frequency is depicted for a DCM boost function in FIG. 7A and for an LLC resonant function above resonance frequency in FIG. 7B. Vertical axes 710 and 720 show the power scales for DCM boost and LLC resonant converters respectively and the horizontal axes 730 show the controlled switching frequency in kHz for each of the functions.

As illustrated in FIG. 7A, the graph of DCM boost power delivery 740 in switching frequency range of 50 kHz to 250 kHz shows a substantially monotonic slope from about 20 W to near zero. In FIG. 7B, the LLC resonant power delivery graph 760 shows a high slope at frequencies below 100 kHz and a smooth slope between 100 kHz to 250 kHz, which is compatible with the DCM boost power delivery graph in FIG. 7A at this frequency range. As shown, the common operation windows for DCM boost converter 750 and for the LLC resonant converter 770 are illustrated in the hashed areas in FIGS. 7A and 7B.

Therefore, it is appreciated that the new topology described in this disclosure and the compatible operating areas of power delivery versus switching frequency control provide a single stage resonant converter integrating boost DCM operation with LLC resonant operation through a common switcher controlled with PFM and complementary nearly 50% duty cycle switching signals and with the merged line rectification in accordance with the teachings of the invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An off line resonant converter, comprising:
a boost storage inductance circuit to be coupled to receive an ac input line voltage;
a switcher circuit coupled to the boost storage inductance circuit, the switcher circuit including stacked first and second passive switching devices coupled to the boost storage inductance circuit, the switcher circuit further including stacked first and second active bidirectional switching devices coupled to the stacked first and second passive switching devices, wherein the stacked first and second active bidirectional switching devices are controlled to generate a square wave signal and to alternately store energy in and receive energy from the boost storage inductance circuit such that a pulsating current is conducted between the boost storage inductance circuit and the switcher circuit, wherein the pulsating current is bidirectional and flows in a first direction when the ac input line voltage is at a first polarity and wherein the pulsating current flows in an opposite second direction when the ac input line voltage is at a second polarity, wherein the pulsating current conducted through the boost storage inductance circuit starts from zero each switching cycle; and a resonant circuit coupled to an output of the switcher circuit to receive the square wave signal from the switcher circuit to generate an output of the resonant converter.

2. The off line resonant converter of claim 1 wherein the switcher circuit further comprises a link capacitance coupled across the stacked first and second active bidirectional switching devices, across the stacked first and second passive switching devices and coupled to a reference potential.

3. The off line resonant converter of claim 2 wherein a first terminal of the output of the switcher circuit is coupled to a node between the stacked first and second active bidirectional switching devices and a second terminal of the output of the switcher circuit is a reference potential coupling of the switcher circuit.

4. The off line resonant converter of claim 2 wherein the link capacitance comprises stacked first and second capacitors coupled across the stacked first and second active bidirectional switching devices and across the stacked first and second passive switching devices.

5. The off line resonant converter of claim 4 wherein a first terminal of the output of the switcher circuit is coupled to a node between the stacked first and second active bidirectional switching devices and a second terminal of the output of the switcher circuit is coupled to a node between the stacked first and second capacitors that provides the reference potential node of the switcher circuit.

6. The off line resonant converter of claim 1 further comprising a controller coupled to generate complementary control signals coupled to be received by the stacked first and second active bidirectional switching devices to generate the square wave signal at the output of the switcher circuit and to alternately store energy to and receive energy from the boost storage inductance circuit.

7. The off line resonant converter of claim 6 wherein the controller is coupled to receive a feedback signal representative of the output of the resonant converter, wherein the controller is coupled to generate the complementary control signals in response to the feedback signal to regulate the output of the resonant converter.

8. The off line resonant converter of claim 7 wherein the complementary control signals coupled to be received by the stacked first and second active bidirectional switching devices have a nearly 50% duty cycle.

9. The off line resonant converter of claim 8 wherein the complementary control signals with nearly 50% duty cycle coupled to be received by the stacked first and second active bidirectional switching devices comprises a non overlapping dead gap between turn off of the first switch and turn on of the second switch.

10. The off line resonant converter of claim 1 wherein the stacked first and second active bidirectional switching devices comprise stacked first and second MOSFET switches.

11. The off line resonant converter of claim 1 wherein the stacked first and second passive switching devices comprise stacked first and second diodes.

12. The off line resonant converter of claim 3 wherein the square wave signal generated by the switcher circuit comprises a dc voltage component modulated with an ac voltage component that is symmetric around the dc component.

13. The off line resonant converter of claim 5 wherein the square wave signal generated by the switcher circuit is an ac symmetric square wave that does not include a dc component.

14. The off line resonant converter of claim 11 wherein the pulsating current flows in the first direction through the first diode when the ac input line voltage is at the first polarity and wherein the pulsating current flows in the opposite second direction through the second diode when the ac input line voltage is at the second polarity.

15. The off line resonant converter of claim 14 wherein the first polarity of the ac input line voltage is a positive polarity and the first direction of the pulsating current flows from the boost storage inductance circuit to the switcher circuit, wherein the second polarity of the ac input line voltage is a negative polarity and the opposite second direction of the pulsating current flows from the switcher circuit to the boost storage inductance circuit.

16. The off line resonant converter of claim 1 wherein the resonant circuit includes an isolation transformer.

17. The off line resonant converter of claim 16 wherein the isolation transformer has a turns ratio adapted to scale a voltage level of the output of the resonant converter.

18. The off line resonant converter of claim 17 wherein a secondary side of the isolation transformer includes a center-tapped secondary winding coupled to two diode rectifiers.

19. The off line resonant converter of claim 17 wherein a secondary side of the isolation transformer includes a single winding coupled to a bridge rectifier.

20. The off line resonant converter of claim 17 wherein a secondary side of the isolation transformer is rectified to generate a regulated dc output.

21. The off line resonant converter of claim 1 wherein the resonant circuit is an LLC resonant circuit comprising a resonant capacitance, a first resonant inductance forming a series resonant frequency and a second resonant inductance forming a parallel resonant frequency, wherein the first resonant inductance is less than the second resonant inductance.

22. The off line resonant converter of claim 21 wherein the first resonant inductance in the LLC resonant circuit comprises at least a leakage inductance of the isolation transformer, wherein the second resonant inductance in LLC resonant circuit comprises at least a magnetizing inductance of the isolation transformer.

* * * * *